Figure 1:
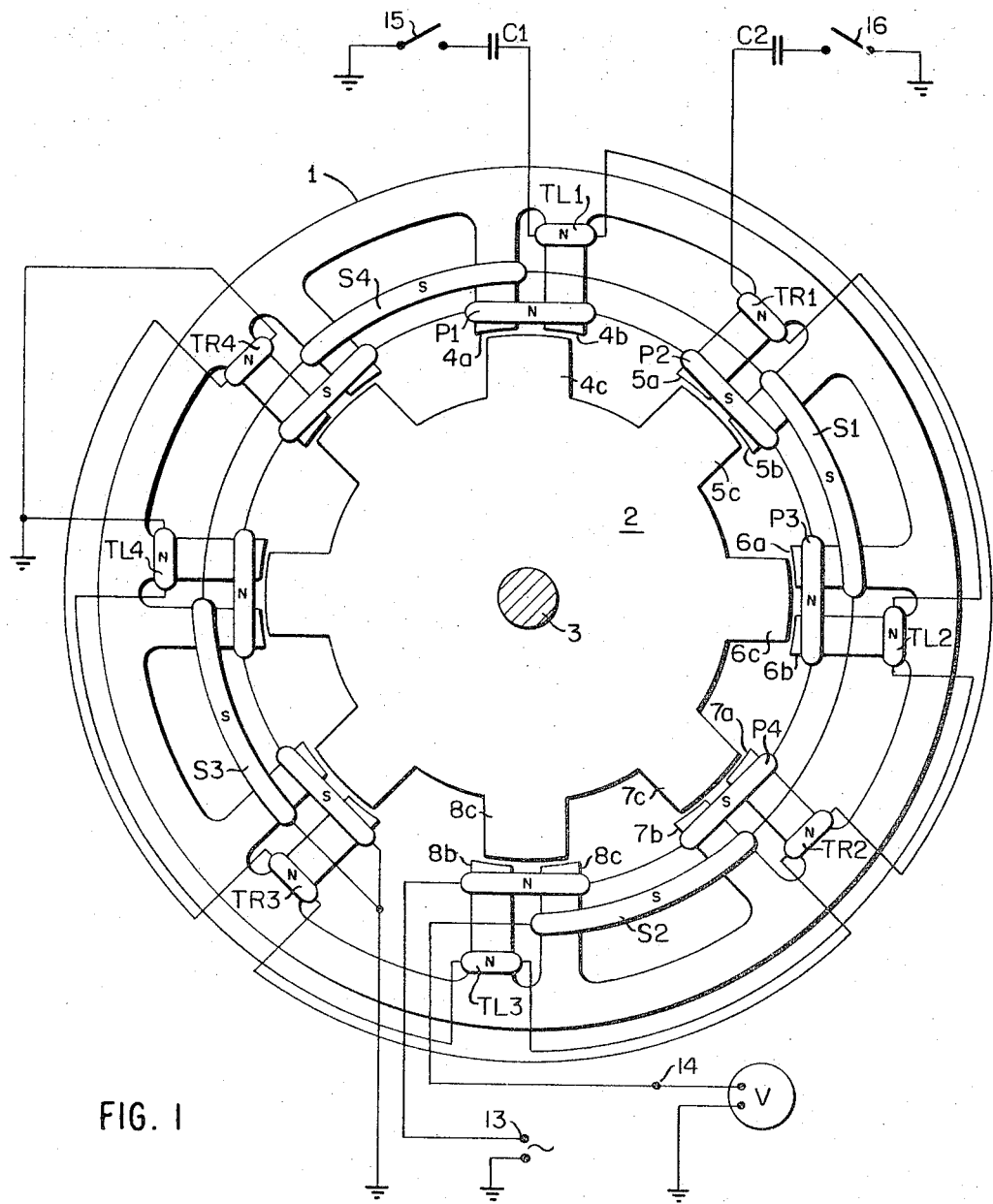

INVENTORS
JOHN R. BOUCHARD
HENRY PACKARD
BY
Kenway, Jenney & Hildreth
ATTORNEYS

INVENTOR.
JOHN R. BOUCHARD
HENRY PACKARD
BY
ATTORNEYS

United States Patent Office 3,368,142
Patented Feb. 6, 1968

3,368,142
SELF-TESTING VARIABLE TRANSFORMER
John R. Bouchard, Canton, and Henry Packard, Norwood, Mass., assignors to Northrop Corporation, Beverly Hills, Calif., a corporation of California
Filed Nov. 15, 1965, Ser. No. 507,949
12 Claims. (Cl. 323—51)

Our invention relates to electromagnetic transducers, and particularly to a novel self-testing variable transformer.

Variable transformers, such as the microsyn, are widely used in guidance, indication and control systems to produce an electrical signal representative of a shaft angle. Routine testing, service and maintenance of such a transformer, when electrically and mechanically connected into a complex system with other transducers, electronic computing or control apparatus, and input signal generators such as gyroscopes or the like, may be quite expensive and time-consuming. It is often a difficult matter to determine whether or not a conventional variable transformer in such a system is functioning properly without disconnecting it from the system and setting up elaborate test equipment. The object of our invention is to facilitate the performance testing of variable transformers.

Our invention is applicable to the construction of variable transformers of the type in which an input shaft controls the reluctance of a magnetic circuit by adjusting the position of a ferromagnetic element movably mounted in the circuit. Such circuits typically comprise a stator on which primary and secondary windings are so disposed that when the primary windings are excited with alternating voltage and the movable element is in a predetermined position, no output voltage is induced in the secondary windings. When the input shaft is moved, an output voltage is induced in the secondary windings having a characteristic proportional to the extent of movement of the shaft. Transducers of this type may be employed in systems in which the input motion signal is restrained, as by a spring, or in system in which the input motion is unrestrained over a predetermined range. Conventionally, the input motion is applied as a torque, although a linear input motion could also be provided for. Briefly, a variable transformer in accordance with our invention includes means integral with the transformer for supplying a simulated mechanical input signal to cause the transformer to produce an output signal that may be measured as an indication of the condition of the transformer. Bascially, this apparatus comprises a tertiary set of windings on the stator of the transformer, unsymmetrically disposed with respect to the primary and secondary windings. To simulate a mechanical input signal to the transformer, we provide a capictor resonant in frequency with the tertiary windings at the frequency at which the primary windings are adapted to be energized, and switching means for connecting the capacitor across the tertiary windings when it is desired to test the performance of the transformer. When the tertiary windings are connected across the capacitor, a magnetomotive force is produced tending to relatively displace the input shaft in a selected sense and thereby produce an output voltage indication across the secondary windings. Preferably, two sets of tertiary windings are provided, each being adapted to produce a magnetomotive force moving the input shaft in a different sense, so that opposite displacement forces may be produced. In accordance with a preferred embodiment of our invention, the tertiary windings link elements of the stator that are also linked by primary windings but which are not linked by secondary windings. By this arrangement, the shunting of the tertiary windings with a capacitor will not affect the signal produced by the secondary windings.

The construction and operation of a self-testing variable transformer in accordance with our invention will best be understood in the light of the following description, together with the accompanying drawings, of various illustrative embodiments thereof.

Figure 3:
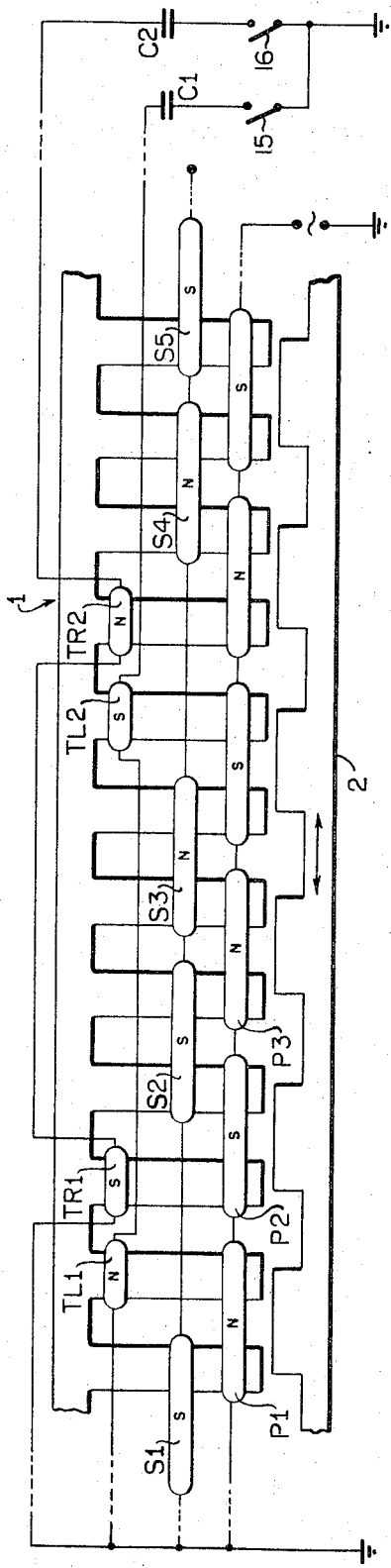
Figure 2:
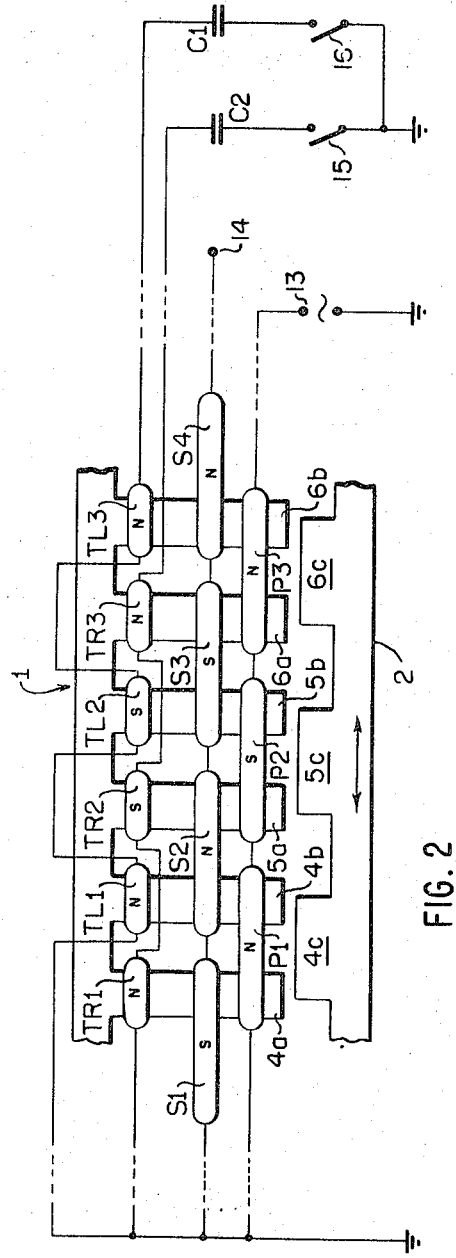

In the drawings:

FIG. 1 comprises a schematic elevation of a self-testing variable transformer in accordance with our invention;

FIG. 2 comprises a schematic diagram of a second embodiment of our invention, developed linearly; and FIG. 3 comprises a linear development of a third embodiment of our invention.

Referring now to the drawings, FIG. 1 shows a variable transformer comprising an outer ferromagnetic element comprising a stator 1, assumed to be fixed with respect to a suitable support, not shown, for relative angular movement with respect to a second ferromagnetic element, here shown as an inner rotor 2 mounted on a shaft 3, the latter being rotatable relative to the stator 1. It will be apparent to those skilled in the art that either element could be the outer one, and either could be the stator or the rotor, without departing from the scope of our invention. However, the arrangement shown is preferred.

The stator 1 may comprise a series of laminations stacked normal to the plane of FIG. 1 in a conventional manner, not shown, and is provided with a plurality of pole teeth, such as the pole tooth 4a. These pole teeth are grouped in pairs, such as the pair comprising the pole teeth 4a and 4b. On each such pair, a coil is wound, forming a portion of the primary winding of the transformer. Thus, the primary coil P1 is wound on the pole teeth 4a and 4b, the primary coil P2 is wound on the pole teeth 5a and 5b, and so on. The senses of the windings in the various coils shown in FIG. 1, and elsewhere in the drawings, are indicated by the legends N and S, referring to the relative polarities of fluxes induced in the core by energization of the windings.

A coil forming a portion of the secondary windings of the transformer is wound on every other pair of adjacent pole teeth linked by different primary windings. Thus, the secondary winding S1 is wound on the pole teeth 5b and 6a. The next adjacent pair of pole teeth 6b and 7a, linked by different primary windings P3 and P4, respectively, have no secondary winding. The secondary winding S2 is wound on the adjacent pole teeth 7b and 8a. The secondary windings S3 and S4 are similarly disposed.

The primary windings such as P1 and P2 are alternately oppositely wound and are connected together in series as indicated in FIG. 1. The primary windings are connected between ground and a terminal 13 of a conventional alternating voltage supply, providing a fixed energizing voltage at a convenient fixed frequency, such as 400 cycles per second.

The secondary windings S1 through S4 are connected in series, and are all wound in the same sense, as indicated by the legend S applied to each coil. As will be apparent to those skilled in the art, the actual sense of the secondary windings is immaterial so long as they are connected in series-aiding relationship with respect to net voltages induced by the primary windings. The set of secondary windings is connected between ground and an output terminal 14, to produce an output signal voltage that may be measured by a conventional voltmeter V, connected between the terminal 14 and ground as shown.

A first set of tertiary windings TL1, TL2, TL3 and TL4 comprises coils wound on each alternate pole tooth that is not linked by a secondary winding. These windings are all connected in series and are wound in the same sense, such that they are in series-aiding relationship with respect to voltages induced by the primary windings. The tertiary windings of the first set are connected between ground and a circuit extending through a first capacitor C1 and a switch 15 to ground. The switch 15 may comprise a manually operable mechanical switch, or it may be in the form of conventional electronic switching apparatus, as may be desirable in a particular installation. It will be apparent that when the switch 15 is open, the tertiary windings will have no appreciable effect on the magnetic circuit of the stator 1, but when the switch is closed current will flow at the frequency of the source. If desired, for use with a number of transformers in a single system, for example, the switching point represented by the switch 15 could be on the other side of the capacitor C1, so that one capacitor could be used with several transformers.

The capacitor C1 is preferably resonant with the series set of coils TL1 through TL4 at the frequency of the supply voltage. The advantage of having the circuit resonant is that, at resonance, a maximum current will be induced in the tertiary circuit with a minimum of turns on the pole teeth.

The rotor 2 may also comprise a series of laminations of ferromagnetic material stacked normal to the plane of FIG. 1. The rotor is provided with a series of projecting pole pieces such as 4c, 5c, 6c and so on, one for each pair of pole teeth on the stator 1. These pole pieces cooperate with the pole teeth to provide variable inductive coupling between the various windings on the pole teeth, in a manner that will be described in detail below. (It should be noted that reference to the pole "teeth" of the stator and the pole "pieces" of the rotor does not imply any difference in magnetic properties, but is simply adopted to distinguish the elements of the stator from the corresponding elements on the rotor.) The relative size and widths of the pole teeth and pole pieces are not shown to scale in FIG. 1, or in the other figures to be described, but are merely adopted for convenience. In practice, the relative shape and size of these elements would be determined by conventional design procedures. However, it is preferred that the pole pieces on the rotor 2 be somewhat narrower than the pair of pole teeth confronting each of them, as indicated in the drawings.

A second set of tertiary windings comprises the coils TR1, TR2, TR3 and TR4, each wound on a different one of the remaining pole teeth that are not linked by secondary windings. Thus, the winding TR1 is wound on the pole tooth 5a, the winding TR2 is wound on the pole tooth 7a, and so on. The second set of tertiary windings is connected in series, and all are wound in the same sense, so that voltages induced by the primary windings are additive. The second set of tertiary windings is connected between ground and a circuit extending through a second capacitor C2 and a switch 16 to ground. The capacitor C2 and the switch 16 may be of the same design and construction as the capacitor C1 and the switch 15 described above.

Having described the construction of this embodiment of our invention, its operation will next be described. Assume that the rotor 2 is in the relative position shown in FIG. 1, with both the switches 15 and 16 open, and that the primary windings are excited. Considering a typical secondary winding such as S1, it will be apparent that it is threaded by a first flux component induced by the primary winding P2 and flowing through a path comprising the pole tooth 5b, the frame of the stator 1, the pole tooth 6a, a first air gap, the pole piece 6c, the body of the rotor 2, the pole piece 5c, and a second air gap back to the pole tooth 5b. An opposite flux component induced by the primary winding P3 threads the winding S1 and flows through the same path in the opposite sense. With the rotor 2 in the position shown, it will be apparent that no net voltage is induced in the secondary winding S1.

Upon rotation of the rotor 2 slightly in a clockwise direction in FIG. 1, it will be seen that the reluctance of the magnetic path linking the primary winding P2 and the secondary winding S1 will be reduced, whereas the reluctance of the path linking the primary winding P3 and the secondary winding S1 will be increased. A net voltage, proportional to the angle of the deflection over an angular range depending on the design of the magnetic circuit, will then be induced in the secondary winding S1. Similar additive voltages will be induced in the secondary windings S2, S3 and S4, causing an output signal indicative of the shaft angle to appear between the terminal 14 and ground. A similar voltage of opposite phase would be induced by counterclockwise rotation of the shaft 3.

Assuming now that the switch 15 is closed, with the rotor 2 and the shaft 3 in the relative position shown in FIG. 1, it will be apparent that voltage will be induced in the coils TL1, TL2, TL3 and TL4 opposing the voltage of the primary windings, with an accompanying net reduction of flux in the pole teeth such as 1b, 6b, and so on. The flux in the pole teeth such as 5a and 7a not linked by one of the set of coils TL will be essentially unaffected. The secondary windings such as S1 will be substantially unaffected by the action of the coils such as TL1, because the secondary windings do not link teeth linked by the tertiary coils. However, with relatively more flux flowing in the pole teeth such as 5a than in the pole teeth such as 1b, a net magnetomotive force will be produced tending to drive the stator 2 counter-clockwise in FIG. 1, producing an output torque on the shaft 3. If the shaft 3 was unrestrained, it would rotate to an angle at which the flux distribution would produce no net magnetomotive force between the stator and rotor. If the shaft was restrained, as by a spring, the shaft would rotate to an angle determined both by the force of the spring and by the magnetic flux distribution change produced by the rotation. In either event, a signal will be produced between the terminal 14 and ground that could be measured, as by the voltmeter V, to indicate whether or not the transformer was operating properly. Assuming, for example, that the rotor 2 was frozen, no output signal would be produced at the terminal 14 when the switch 15 was closed.

Assuming that the switch 15 is open and the switch 16 is closed, a similar action would take place except that the torque would be opposite that produced by the closure of the switch 15. If both switches were sequentially actuated and an appropriate voltage indication was obtained, that would indicate that the transformer rotor was free to rotate in either direction.

The apparatus of FIG. 1 is suitable for the construction of transformers having rotors with 4, or multiples of 4, pole pieces on the rotor. FIG. 2 shows an embodiment of our invention adapted for use in transformers having any multiple of 2 pole pieces on the rotor. This embodiment is characterized by maximum transformer sensitivity, in that secondary windings are provided that link each of the pole teeth on the stator. In FIG. 2, as in the preceding embodiment, primary windings are provided on each pair of pole pieces such as 4a and 4b, and these windings are connected in series and oppositely wound. Each pair of adjacent pole teeth such as the teeth 4b and 5a, that are linked by different primary coils, are linked by a secondary winding such as S2. The secondary windings such as S1, S2, S3 and S4, like the primary windings, are connected in series and alternately oppositely wound.

A first set of tertiary windings comprises the coils TL1, TL2, TL3, and so on, each wound on a different alternate pole tooth such as the pole teeth 4b, 5b, etc. As it is desired that these windings function in series-aiding relationship, they are alternately oppositely wound because they are alternately associated with oppositely wound primary windings. This set of tertiary windings is connected in series between ground and a circuit extending through the capacitor C1 and the switching means 15 as in the embodiment of FIG. 1. When the switch 15 is closed, the current flowing in the tertiary windings TL will cause a magnetomotive force tending to urge the rotor 2 to the left in FIG. 2 relative to the stator, or counter-clockwise in a rotary machine of the type shown in FIG. 1.

A second set of tertiary windings comprises the coils TR1, TR2, TR3 etc., wound on the remaining teeth of the stator 1, and connected in series and alternately oppositely wound. This series combination of coils is connected through the capacitor C2 and the switching means 16 as in the embodiment shown in FIG. 1. When the switch 16 is closed, and the primary windings are excited, a magnetomotive force will be induced between the stator and the rotor urging the rotor 2 to the right in FIG. 1. This embodiment of our invention is capable of greater sensitivity as a rotary transformer, because no teeth are devoted simply to producing torque. However, some winding space must be given up on the pole teeth to provide for the tertiary windings, so that the net advantage is not large.

The test procedure utilizing the apparatus of FIG. 2 is similar to that used in connection with the apparatus of FIG. 1, except that current flowing in either set of tertiary windings will influence the signal produced on the secondary windings, and the indication produced by torque applied to the rotor 2 will, therefore, be non-linear. However, for many purposes the test of performance may still be satisfactory, because linearity is not required simply to detect whether or not the rotor is frozen. For example, a rotor positioned at null might produce an output voltage between the terminal 14 and ground of 4 volts with the stator frozen, and 12 volts with the rotor at an angle determined by the torque applied when one of the switches 15 and 16 is closed. A difference in the signal values obtained with the switches open and with one of them closed would indicate that the rotor was free to rotate, or, in a constrained system, was at least as free as the constraint provided should permit.

FIG. 3 shows a third modification of our invention in which transformer sensitivity is improved without sacrificing the advantage of the FIG. 1 arrangement that the tertiary windings do not influence the signal produced by the secondary windings. This embodiment of our invention is adapted to constructions in which the stator has 6, or higher multiples of 6, pole pieces. As shown in FIG. 3, the primary windings P1, P2, P3, and so on, are wound in the same manner as in the previous embodiments, being connected in series and alternately oppositely wound. Secondary windings such as S1, S2, S3, and so on, each link adjacent teeth linked by different primary windings, and every third pair of such teeth has no secondary winding. On one set of corresponding ones of the teeth not linking secondary coils are wound a first set of tertiary coils TL1, TL2, and so on. On the remaining teeth not linked by secondary windings the second set of tertiary coils, TR1, TR3, and so on, are wound. By this arrangement, two-thirds of the normal transformer sensitivity is available, and yet substantial torque may be provided for test purposes. If greater test torque is desired, it will be apparent that 8 pole teeth could be used on which to wind the tertiary torquing windings, and 4 teeth could be used on which to wind secondary coils to provide an output signal for normal use. That arrangement would provide only one-third of the normal transformer sensitivity, however.

While we have described our invention with reference to the details of various preferred embodiments thereof, many changes and variations will be apparent to those skilled in the art upon reading our description, and such can obviously be made without departing from the scope of our invention.

Having thus described our invention, what we claim is:

1. A variable transformer, comprising first and second ferromagnetic elements, said first element comprising a plurality of pole pieces, said second element comprising a set of pairs of pole teeth, one pair for each pole piece of said first element, said elements being mounted together for relative movement over a closed path with said pole pieces in spaced confronting relationship with said pole teeth and separated therefrom by an air gap, a set of primary windings, one on each pair of pole teeth, a set of secondary windings, each linking two adjacent teeth each linked by a different primary winding, a set of tertiary windings, each linking a single pole tooth, said primary windings being connected in series, said secondary windings being connected in series-aiding relationship with respect to voltages induced by said primary windings when energized, a capacitor, and switching means operable when actuated for connecting said capacitor across said tertiary windings.

2. A variable transformer, comprising a first ferromagnetic member including a supporting portion and a plurality of spaced pole pieces projecting from the supporting portion, a second ferromagnetic member including a supporting portion and a set of spaced pairs of spaced pole teeth projecting from the supporting portion, one pair for each pole piece of the first member, the spacing of said pairs corresponding to the spacing of the pole pieces of said first member, means mounting said first and second members together for relative motion over a closed path with the pole pieces of said first member confronting the pole pieces of said second member and spaced therefrom by a predetermined gap, a primary winding on each of two adjacent pairs of pole teeth, said primary windings being connected in series and alternately oppositely wound, a secondary winding on adjacent teeth linked by different primary windings, a tertiary coil on each of two adjacent teeth linked by different primary windings and not linked by said secondary winding, a first capacitor, a second capacitor, first switching means operable when actuated to connect said first capacitor across one of said tertiary coils, and second switching means operable when actuated to connect said second capacitor across the other of said tertiary coils.

3. A variable transformer, comprising a first ferromagnetic element having a plurality of projecting pole pieces, a second ferromagnetic element provided with a pair of projecting teeth for each pole piece on said first element, said elements being mounted for relative movement with said teeth confronting said pole pieces, the spacing of said pairs corresponding to the spacing of said pole pieces, a set of primary coils, each wound on a different one of said pairs, said coils being connected in series and alternately oppositely wound, a set of secondary coils, each wound on two adjacent teeth threading different primary coils, whereby no net voltage is induced in said secondary coils upon energization of said primary coils at a null relative position of said elements and a net voltage is induced in said secondary coils at relative positions of said elements adjacent said null position, at least one tertiary coil wound on one of said teeth, means for applying an alternating voltage of a predetermined frequency to said primary coils, a capacitor resonant with said tertiary coil at said predetermined frequency, and switching means actuable to connect said coil across said tertiary coil to produce an unbalanced magnetic force between said elements in said null position.

4. In a variable transformer, first and second ferromagnetic pole pieces, means connecting said pole pieces together in spaced relationship, a third pole piece movably mounted adjacent to and confronting said first and second pole pieces, a primary winding linking said first and second pole pieces, a secondary winding linking said first pole piece, a tertiary winding linking said second pole piece, means for energizing said primary winding with alternating current at a predetermined frequency, a capacitor resonant with said tertiary coil at said frequency; and switching means operable to connect said capacitor across said tertiary coil.

5. In a variable transformer, a first ferromagnetic element comprising a pair of pole pieces, a second ferromagnetic element mounted for movement relative to said first element over a closed path, said second element comprising a pair of teeth confronting each pole piece of the first element, a primary coil wound on each pair of pole teeth, said primary coils being connected in series and alternately oppositely wound, a secondary coil wound on adjacent teeth, one from each pair, a tertiary coil wound on one tooth not linked by said secondary coil, a capacitor, and switching means operable when actuated to connect said capacitor across said tertiary coil, whereby when said primary coils are energized with an alternating voltage, said elements are positioned to null the voltage induced in said secondary winding, and said switching means is actuated, a magnetomotive force is produced tending to cause relative movement of said elements along said path in a predetermined sense.

6. A self-testing variable transformer, comprising a ferromagnetic stator having an even plurality of at least four projecting pole teeth, a ferromagnetic rotor rotatably mounted on said stator and having a projecting pole piece for each pair of pole teeth, each of said pole pieces confronting a different pair of teeth and having an equal magnetic relation to both confronted teeth in at least one relative rotated position, a primary coil set comprising at least a primary coil wound on each pair of at least two adjacent pairs of teeth, said coils being alternately oppositely wound and connected in series, a secondary coil set comprising at least one secondary coil wound on at least one adjacent pair of teeth linked by different primary coils, a tertiary coil set comprising at least one tertiary coil wound on at least one tooth linked by a primary coil, a capacitor, and switching means operable when actuated to connect said capacitor across said tertiary coil set.

7. The apparatus of claim 6, further comprising means for energizing said primary coils with alternating voltage at a predetermined frequency, and in which said capacitor is resonant with said tertiary coil set at said frequency.

8. The apparatus of claim 6, in which said primary coil set comprises a primary coil wound on each pair of teeth, said secondary coil set comprises a secondary coil wound on each adjacent pair of teeth linked by different primary coils, said tertiary coil set comprises a first subset of tertiary coils, including the first recited tertiary coil, wound on a different one of corresponding ones of each pair of teeth linked by a primary coil, the coils of said first subset being connected together in series-aiding relationship relative to voltages induced by the primary coil when energized, and further comprising a second subset of tertiary coils wound on each remaining tooth, the coils of the second subset being connected together in series-aiding relationship relative to voltages induced by the primary coils when energized, a second capacitor, and switching means operable when actuated to connect said second capacitor across said second subset of coils.

9. The apparatus of claim 8, further comprising means for energizing said primary coils with alternating voltage at a predetermined frequency, and in which said first recited capacitor is resonant with said first tertiary coil subset and said second capacitor is resonant with said second tertiary coil subset at said frequency.

10. The apparatus of claim 6, in which said stator has at least eight pole teeth, a primary coil is wound on each pair of teeth, a secondary coil is wound on every other pair of adjacent teeth linked by different primary coils, said secondary coils being connected together in series-aiding relationship with respect to net voltages induced by said primary coils when energized, each of a first set of tertiary coils including said first recited tertiary coil is wound on a different one of a first set of teeth comprising all teeth linked by a primary coil wound in a first sense and not linked by a secondary coil, said first set of coils being connected in series-aiding relationship with respect to voltages induced by said primary coils when energized, each of a second set of tertiary coils is wound on a different one of the remaining teeth not linked by a secondary coil, said second set of coils being connected in series-aiding relationship with respect to voltages induced by said primary coils when energized, and said switching means connects said capacitor across said first set of coils, and further comprising a second capacitor and switching means operable when actuated to connect said second capacitor across said second set of coils.

11. The apparatus of claim 6, in which said stator has at least twelve pole teeth, a primary coil is wound on each pair of teeth, a secondary coil is wound on each of the first two of each three adjacent pairs of teeth not linked by the same primary coil, said secondary coils being connected in series and alternately oppositely wound, each of a first set of tertiary coils including said first recited tertiary coil is wound on a different one of a first set of teeth comprising all teeth linked by primary windings wound alternately in opposite senses and not linked by secondary coils, said first set of coils being connected in series-aiding relationship with respect to voltages induced by said primary windings when energized, and further comprising a second set of tertiary windings wound on a different one of the remaining teeth not linked by a secondary coil, said second set of coils being connected in series-aiding relationship with respect to voltages induced by said primary coils when energized, a second capacitor, and switching means operable when actuated to connect said second capacitor across said second set of coils.

12. The apparatus of claim 11, further comprising means for energizing said primary coils with alternating voltage at a predetermined frequency, and in which said first recited capacitor is resonant with said first tertiary coil set and said second capacitor is resonant with said second tertiary coil set at said predetermined frequency.

References Cited

UNITED STATES PATENTS

| 2,882,484 | 4/1959 | Swainson | 323—51 |
| 3,085,192 | 4/1963 | Maier | 323—51 |
| 3,128,044 | 4/1964 | Packard | 336—135 |
| 3,225,229 | 12/1965 | Packard | 336—135 X |

JOHN F. COUCH, *Primary Examiner.*

W. E. RAY, *Assistant Examiner.*